W. H. CRANE.
WIND SHIELD FOR HARVESTERS.
APPLICATION FILED JULY 31, 1916.
1,240,424.
Patented Sept. 18, 1917.
3 SHEETS—SHEET 3.
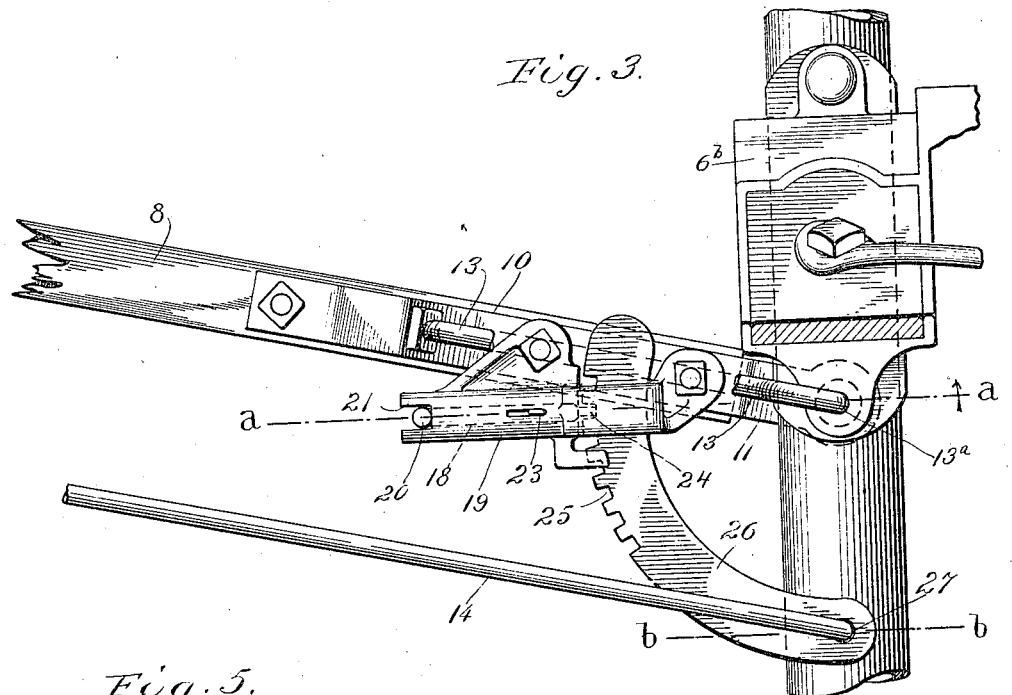
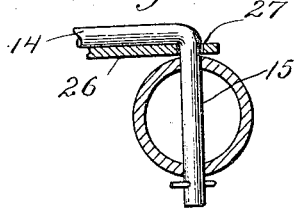
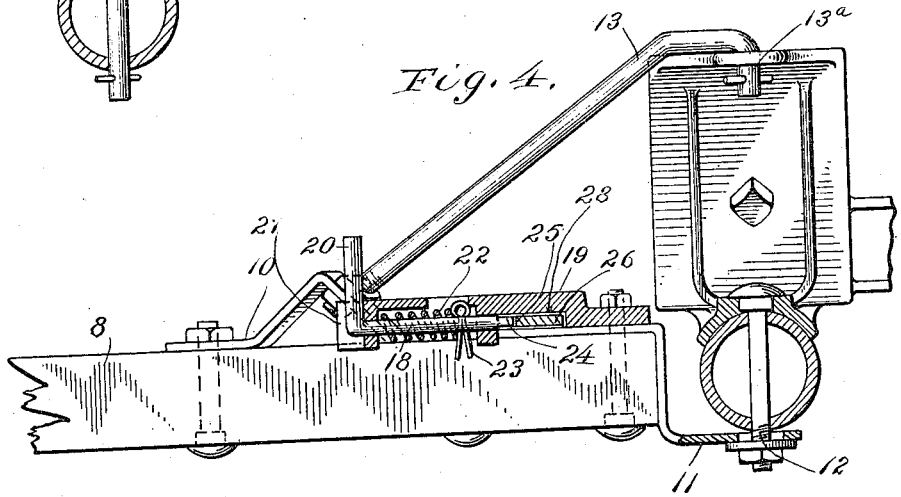
Inventor:
W. H. Crane
by Rogers, Kennedy & Campbell
Attys.
Attest:

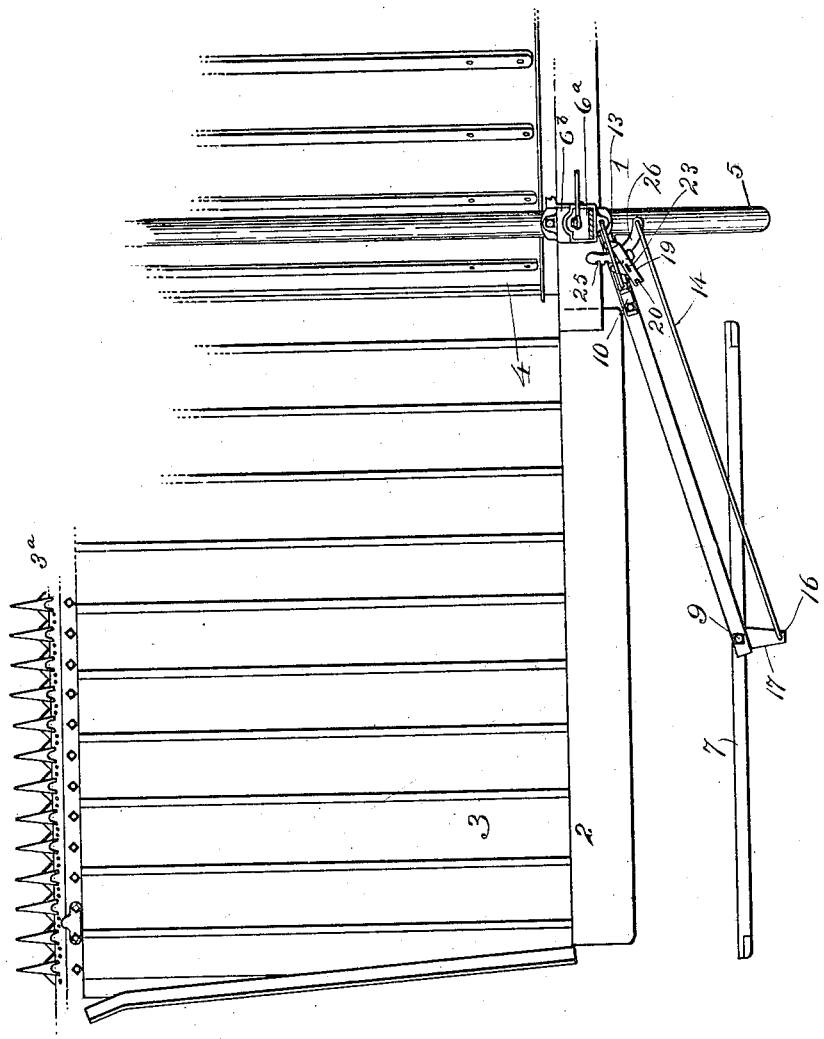

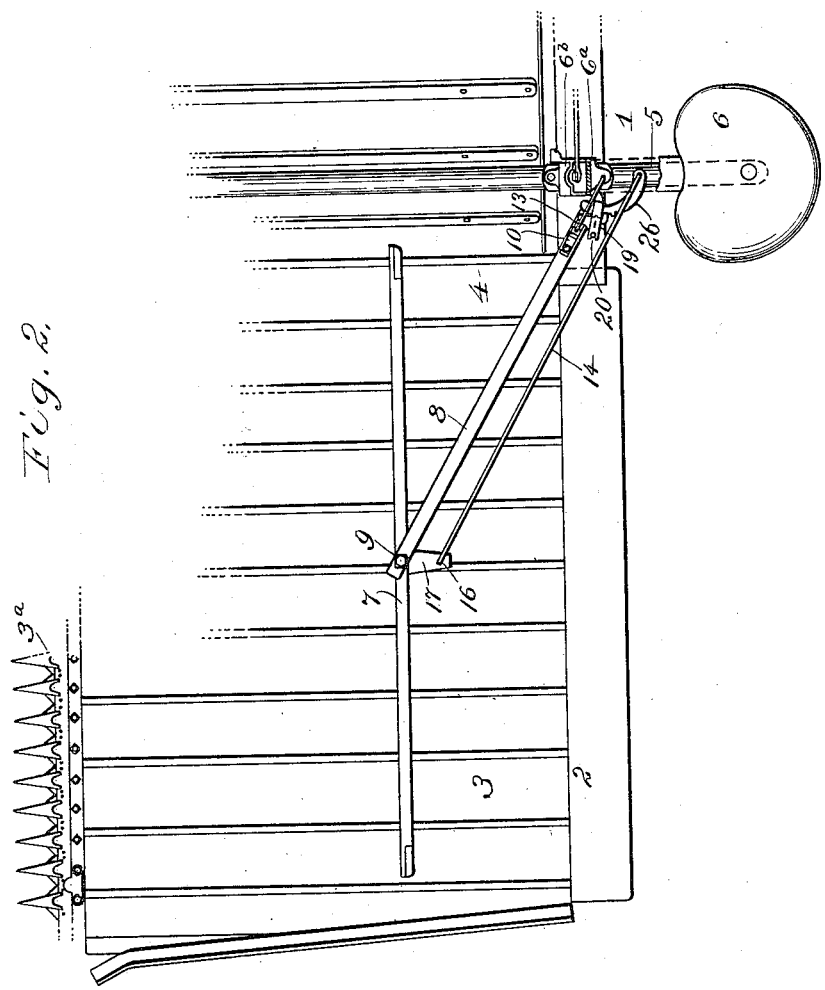

UNITED STATES PATENT OFFICE.

WILLIAM H. CRANE, OF POUGHKEEPSIE, NEW YORK, ASSIGNOR TO MOLINE PLOW COMPANY, A CORPORATION OF ILLINOIS.

WIND-SHIELD FOR HARVESTERS.

1,240,424.

Specification of Letters Patent.

Patented Sept. 18, 1917.

Application filed July 31, 1916. Serial No. 112,209.

*To all whom it may concern:*

Be it known that I, WILLIAM H. CRANE, a citizen of the United States, residing at Poughkeepsie, in the county of Dutchess and State of New York, have invented certain new and useful Improvements in Wind-Shields for Harvesters, of which the following is a specification, reference being had therein to the accompanying drawing.

This invention relates to harvesting machines, and is concerned more particularly with the wind-shield or wind-break which is sustained adjustably in an upright position over the grain platform and parallel with the finger bar, to prevent the wind from interfering with the proper fall of the grain on the platform when severed by the knives.

My invention consists of a construction of improved form and arrangement for maintaining the wind-shield in operative relation to the platform and finger bar, and for quickly and conveniently adjusting it to and from the finger bar, to meet the varying conditions encountered in practice with respect to the length of grain being harvested.

In the accompanying drawings:

Figure 1 is a top plan view of a portion of the main frame and the platform frame of a harvesting machine having my invention applied thereto, the wind-shield being shown in its rearward position to accommodate long grain.

Fig. 2 is a similar view with the wind-shield adjusted to a forward position to accommodate short grain.

Fig. 3 is a top plan view on an enlarged scale of a portion of the machine frame and the adjacent connected parts sustaining the wind-shield.

Fig. 4 is a vertical sectional elevation on the line $a$—$a$ of Fig. 3.

Fig. 5 is a similar view on the line $b$—$b$ of Fig. 3.

Referring to the drawings:

1 indicates a portion of the main frame of a harvesting machine; 2 the horizontal grain platform sustained thereby and provided as usual with a carrier apron 3 and with a finger bar $3^a$; and 4 indicates the lower end of the upper elevator apron to which the grain is conveyed by the platform carrier.

5 indicates a frame-member known as the seat supporting member, which extends in a fore and aft direction at the inner end of the platform and sustains a driver's seat 6 by means of a seat spring $6^a$ and a seat spring bracket $6^b$.

7 indicates a wind-shield or wind-break consisting as usual of a flat rectangular screen or board which is sustained in an upright position over the grain platform, parallel with the finger bar, and serves to shield the falling grain from wind currents so that it will be properly deposited on the platform carrier.

My invention is directed to the means for sustaining the wind-shield so that it may be moved or adjusted horizontally to and from the finger bar, and be maintained in all of its positions of adjustment, parallel with the finger bar.

In accordance with my invention the wind-shield is pivoted between its ends to the outer end of a hanger arm 8 on a vertical axis formed by a vertical pivot bolt 9 extending loosely through the end of the arm and into the top bar of the wind-shield. At its inner end the hanger arm has fixed to it a strap or plate 10, the end of which projects beyond the end of the arm in the form of a finger 11 which is extended beneath the seat supporting member and is pivoted thereto on a vertical axis by means of a vertical pivot bolt 12 extending through the seat supporting member and the finger. The weight of the arm in its swinging movements on the bolt 12, is sustained by a brace bar 13, the upper end of which is provided with a depending journal $13^a$ mounted in a bearing in the seat-spring bracket in vertical alinement with the axis of the bolt 12, and the lower end of which is firmly connected to the strap 10. As a result of this construction, the hanger arm is free to swing horizontally above the platform and relatively to the frame on a vertical axis situated at the inner end of the arm, and the wind-shield is free to swing relatively to the outer end of the arm about a vertical axis parallel with the first mentioned axis, the result being that the shield may be moved in a fore and aft direction over the platform to and from the finger bar from a rear position as shown in Fig. 1 to a forward position as shown in Fig. 2.

In order that in these movements of the wind-shield it will be caused to maintain its parallelism with the finger bar, a link 14 is provided which extends in rear of the hanger arm and parallel therewith, the inner end of the link being provided with a depending journal 15 mounted in a vertical bearing in the seat supporting member, rearward of and in line with the pivotal axis of the hanger arm, and the outer end of the link being provided with a depending journal 16 mounted in a bearing in the rear end of a horizontal bracket 17 fixed to and projecting rearwardly from the wind-shield, the said bearing being in rear of and directly in line with the pivotal connection of the outer end of the hanger arm with the wind-shield. The hanger arm and link thus form in effect a parallel movement which, while permitting the parts to swing about their respective axes in the movements of the wind-shield to and from the finger bar, will maintain the wind-shield at all times parallel with the finger bar.

In order that the movements of the hanger arm may be conveniently controlled by the driver, and in order that the parts may be releasably locked against movement to hold the wind-shield in its different positions of adjustment, I provide a locking latch in the form of a horizontal latch bolt 18 which is mounted to slide back and forth in a latch casing 19 fixed to the upper side of the hanger arm adjacent its inner end. The outer end of the latch bolt is provided with a vertical actuating arm 20 extending upwardly above the latch casing so that it may be conveniently operated by the driver's foot, the said arm in the movements of the latch bolt sliding between the walls of a slot 21 in the end of the casing by which means the arm is maintained in an upright position. The latch bolt is acted on by a spring 22 encircling the same and bearing at one end against the end of the casing and at its opposite end against a pin 23 fixed to the latch bolt, the tendency of the spring being to project the latch bolt inwardly and maintain it yieldingly in a locking position as shown in Figs. 3 and 4. The inner end of the bolt is formed with a locking tooth 24 adapted to enter any one of a series of notches 25 in the edge of a horizontal segment plate 26, the inner end of the plate being provided with an opening 27 through which the journal 15 on the end of the link 14 extends, and by which it is pivoted to the seat sustaining member on a vertical axis coincident with the axis of the connection of the link 14 therewith. At its free end the segment plate slides through and is guided in a horizontal slot or opening 28 in the latch casing in such position that in the relative movement of the parts, the notches in the plate will be presented in position to receive the locking tooth on the latch bolt. When the locking tooth is engaged in one of the notches as shown in Fig. 3, the parts will be locked in position and held against relative motion, thereby holding the wind-shield in the particular position to which it was adjusted; but when the tooth is disengaged from the notch, the parts will be free to be swung about their respective axes, the segment plate in such movement sliding through the guiding opening in the latch casing, with the notches in the plate in position to be engaged by the locking tooth.

In the operation of the mechanism by the driver to adjust the position of the wind-shield he places his foot on the vertical actuating arm of the latch bolt and slides the bolt endwise against the pressure of the spring, the locking tooth being by this action disengaged from the notch in which it was seated and thereby unlocking the parts and leaving them free to be swung about their axes. If the shield is to be moved forward toward the finger bar, the driver, while holding the latch disengaged, pushes forward with his foot and thereby swings the hanger arm forward, which correspondingly shifts the shield in like direction. When the shield has been thus adjusted to its proper position, the pressure of the foot on the latch bolt is relieved, and the spring acting, will seat the locking tooth in one of the notches in the segment plate and the parts will thus be locked firmly in position. To adjust the shield in the opposite direction, the foregoing actions are repeated, but the hanger arm is moved by the driver's foot rearwardly instead of forwardly.

By the employment of the notched segment plate pivoted to the frame member and guided on the hanger arm in position to be engaged by the latch, flexibility of movement is given to the parts in the operation of adjusting the same, and the latch is enabled to engage with certainty between the notches without requiring a very close or accurate fit of the parts. The upwardly extending actuating arm on the latch bolt movable horizontally in controlling the locking and unlocking of the latch, affords a very convenient means for operation by the foot of the driver, the continued pressure of the foot on the actuating arm, exerted in either direction after the latch is unlocked, causing the hanger arm to be moved back and forth and the wind-shield to be correspondingly moved. The adjusting operation is therefore conveniently effected, and direct and certain in its action.

In the foregoing description and accompanying drawings I have set forth my invention in the particular detailed form and construction of the parts which I have found in practice to answer to a satisfactory degree the ends to be attained. It will be manifest, however, that these details may be variously changed and modified without departing from the limits of my invention, provided the operation will be substantially as above described; and it will be understood that the invention is not limited to any particular form or construction of the parts except in so far as such limitations are specified in the claims.

Having thus described my invention, what I claim is:

1. In a harvester, the combination of a frame, a grain platform thereon, a hanger arm pivoted to the frame and extending above the platform, a wind-shield pivoted to said arm, a link pivoted to the frame and wind-shield respectively, a plate pivoted to the frame on the pivotal axis of the connection of the link therewith and extending adjacent the hanger arm, and a releasable locking latch on the hanger arm in position to engage the plate and lock the parts in position.

2. In a harvester, the combination of a frame, a grain platform thereon, a hanger arm pivoted to the frame and extending above the platform, a wind-shield pivoted to said arm on an upright axis, a link pivoted at one end to the frame on an axis parallel with the axis of the hanger arm and pivoted at its opposite end to the wind-shield on an axis parallel with the axis of the connection of the wind-shield with the hanger arm, a notched plate pivoted to the frame on the axis of the pivotal connection of the link therewith and guided in the hanger arm, and a releasable locking latch sustained by the hanger arm in position to engage the notches in the plate to lock the parts in position.

3. In a harvester, the combination of a frame, a grain platform thereon, a hanger arm pivoted to the frame and extending above the platform, a wind-shield pivoted to the hanger arm, a link pivoted to the frame and wind-shield respectively, a plate pivoted to the frame on the axis of the pivotal connection of the link therewith, and a releasable locking latch on the hanger arm in position to engage the plate and lock the parts against relative motion.

4. In a harvester, the combination of a frame, a grain platform thereon, a hanger arm pivoted to the frame and extending above the platform, a wind-shield pivoted to the hanger arm, a link pivoted to the frame and wind-shield respectively, a plate pivoted to the frame and extending adjacent the hanger arm, and a releasable locking latch sustained by the hanger arm and movable horizontally into and out of engagement with the plate to lock the parts against relative motion, said locking latch being provided with an upwardly extending actuating arm in position to be operated by the driver's foot.

In testimony whereof, I have affixed my signature in presence of two witnesses.

WILLIAM H. CRANE.

Witnesses:
Wm. J. Merkle,
G. H. Michaelis.

Copies of this patent may be obtained for five cents each, by addressing the "Commissioner of Patents, Washington, D. C."